United States Patent
Rust

(10) Patent No.: US 8,115,760 B2
(45) Date of Patent: Feb. 14, 2012

(54) PICTORIAL REPRESENTATION OF THREE-DIMENSIONAL DATA RECORDS

(76) Inventor: Georg-Friedemann Rust, Gauting (DE)

( * ) Notice: Subject to any disclaimer, the term of this patent is extended or adjusted under 35 U.S.C. 154(b) by 835 days.

(21) Appl. No.: 11/870,764

(22) Filed: Oct. 11, 2007

(65) Prior Publication Data

US 2008/0246756 A1    Oct. 9, 2008

(30) Foreign Application Priority Data

Oct. 16, 2006   (DE) .................. 10 2006 048 834

(51) Int. Cl.
*G06T 15/00* (2011.01)

(52) U.S. Cl. ........ 345/419; 345/421; 345/424; 345/426; 345/629; 382/128; 382/154

(58) Field of Classification Search .................. 345/419, 345/421, 424, 426, 473, 502; 382/128, 154
See application file for complete search history.

(56) References Cited

U.S. PATENT DOCUMENTS

| | | | |
|---|---|---|---|
| 4,365,339 A * | 12/1982 | Pavkovich et al. ............. | 378/15 |
| 5,842,473 A * | 12/1998 | Fenster et al. ................ | 600/445 |
| 6,603,868 B1 | 8/2003 | Ludwig et al. | |
| 6,697,664 B2 * | 2/2004 | Kienzle, III et al. .......... | 600/427 |
| 7,061,484 B2 * | 6/2006 | Bailey et al. .................. | 345/419 |
| 7,356,178 B2 * | 4/2008 | Ziel et al. ...................... | 382/154 |
| 2006/0126920 A1 | 6/2006 | Rust | |
| 2006/0170764 A1 * | 8/2006 | Hentschke ....................... | 348/42 |
| 2007/0161854 A1 * | 7/2007 | Alamaro et al. .............. | 600/109 |
| 2008/0020362 A1 * | 1/2008 | Cotin et al. ................... | 434/267 |
| 2010/0016709 A1 * | 1/2010 | Gilboa et al. ................. | 600/424 |

FOREIGN PATENT DOCUMENTS

| | | |
|---|---|---|
| DE | 19854241 A1 | 6/2000 |
| DE | 10246355 A1 | 4/2004 |
| EP | 0791894 A2 | 8/1997 |

* cited by examiner

*Primary Examiner* — Kimbinh T Nguyen
(74) *Attorney, Agent, or Firm* — IP Strategies

(57) ABSTRACT

The invention relates to a method for the pictorial representation of a three-dimensional measuring data record, comprising the creation of the three-dimensional measured data record by means of a computer tomographic or nuclear spin tomographic device, the processing of a first subset of the three-dimensional measured data record for a pictorial reproduction in a first pictorial representation in a first representation layer, and the processing of at least one second subset of the three-dimensional measured data record for a pictorial reproduction in at least one second pictorial representation in at least one second representation layer, wherein at least one value of at least one orientation parameter for the determination of the orientation of the at least one second representation layer with respect to the first representation layer can be selected by means of a control device.

26 Claims, 2 Drawing Sheets

PICTORIAL REPRESENTATION OF THREE-DIMENSIONAL DATA RECORDS

BACKGROUND OF THE INVENTION

The invention relates to a method for the pictorial representation of a three-dimensional measured data record. The invention in particular relates to a device and a method for virtual endoscopy, such as in particular virtual coloscopy.

The pictorial representation of three-dimensional measured data is a general important task of computer-assisted data analysis and preparation. Imaging methods are increasingly important, in particular in the medical field. In this field, X-ray photography, radiograms, nuclear spin tomography pictures etc. can be evaluated for diagnostic purposes.

One example of use relates to the endoscopy of the large intestine (colon), the so-called coloscopy, which is conventionally performed by means of an endoscope especially developed for this purpose. Such a coloscope comprises an optical system which is, as a rule, connected to a screen to permit the physician to make a diagnosis. The introduction of the coloscope into the intestinal area is perceived as unpleasant or even painful by many patients, and there always is a risk, in particular in case of inflammations of the intestinal wall, that the intestinal wall is pierced by the coloscope.

Virtual coloscopy has therefore been developed as an alternative, where no physical coloscope has to be introduced into the body of the patient. The methods and devices of computer tomography/nuclear spin tomography are rather employed instead of coloscopes for recording measured data and optically representing these data. The development of virtual coloscopy has been decisively supported by the fact that the performance of complex image processing methods has meanwhile become possible without difficulties thanks to the high computing power of recent computers.

For virtual coloscopy, a high number of parallel sections is recorded spatially resolved with a tomography means. One set of two-dimensional image data corresponds to each of these sections. These sets are converted into a three-dimensional measured data record with the assistance of a computer. From the three-dimensional measured data record, two-dimensional image data can in turn be calculated, which are independent of the orientation of the section during the actual measurement, e.g. oblique with respect to it. The two- and three-dimensional image data are as a rule reproduced on two-dimensional reproduction means (monitor, photography, etc.) as tomograms (i.e. all imaged matrix dots emanate from one intersecting plane), or as quasi three-dimensional images which impart a spatial impression in a manner similar to that of a conventional photography (the imaged matrix dots do not all emanate from one and the same plane).

It should be noted in this context that a priori no determinations can be made as to which of the views is best suited for a diagnosis as significant as possible. Although the spatial (quasi three-dimensional) representations are very demonstrative due to the imparted spatial impression and are thereby of assistance for the orientation, just in these representations, diagnostic findings, such as lesions etc., can be hidden by tissue (e.g. a fold in the intestine) and therefore not be visible. In contrast, in tomograms there are no such hidden sites, however, in the performance of a treatment that normally necessitates a coordination into three directions in space they are not very helpful.

The German patent application DE 10246355 A1 discloses a method and a device for the simultaneous pictorial representation of measured data that have been taken of a large intestine in several, two- and three-dimensional views. In one of the views, a selection can be made the relative position of which is shown in the other views. The automatic orientation of the individual pictorial representations with respect to one another, however, is fixed, which makes a quick, easily manageable and arbitrary change of the viewing direction, in particular the relative position of the intersecting planes of one of the representations to another one, impossible. This, however, is extremely desirable for diagnostic reasons and with respect to the acceptance of such a device by the market.

DESCRIPTION OF THE INVENTION

In view of the above-described problems, it is an object of the invention to provide methods and devices by means of which the illustrated disadvantages of virtual coloscopy can be avoided.

This object is achieved by the method of claim 1 and the image processing and image reproduction system with the features of claim 18. Advantageous further developments are stated in the depending claims.

Although the invention has been developed especially in view of virtual coloscopy and is described with respect to this field of application, it should be understood that the basic ideas of the invention can be applied to any arbitrary three-dimensional data record. Possible other fields of application in medicine are all types of virtual endoscopy, other tomography methods, ultrasound examination methods, X-ray examinations with tracer substances, etc. A particularly important other application relates to virtual bronchoscopy. The detection of pulmonary carcinomas as well as the formation of metastases in lymph nodes can be improved with respect to prior art on the basis of the method disclosed herein.

The method according to the invention for the pictorial representation of a three-dimensional measured data record comprises the steps of:

creating the three-dimensional measured data record by means of a computer tomographic or nuclear spin tomographic device;

processing a first subset of the three-dimensional measured data record for a pictorial reproduction in a first pictorial representation in a first representation layer, and processing at least one second subset of the three-dimensional measured data record for a pictorial reproduction in at least one second pictorial representation in at least one second representation layer, wherein at least one value of at least one orientation parameter for the determination of the orientation of the at least one second representation layer with respect to the first representation layer is selectable by means of a control device.

Such a control device or such an orientation parameter to be selected by the same are not known in prior art. A user is enabled according to the invention to conveniently and quickly select the orientation of the representation layer(s) (intersecting plane) of the second pictorial representation(s). The second representation layer will be generally different from the first one. The at least one second subset of the measured data record used for the at least one second pictorial representation can and will generally comprise at least some data of the first subset. The first subset can absolutely also consist of the complete three-dimensional measured data record.

The measured data record can in particular represent a portion of a human body taken by means of the computer tomographic or nuclear spin tomographic device. This portion of the human body can be in particular an organ, in particular the intestine. Lungs and bronchia as well as blood vessels in general of the human body can also be represented by the three-dimensional data record.

The user is in particular enabled to have several second pictorial representations quickly displayed subsequently on the basis of the first pictorial representation and to thereby get a general idea of the respective represented region from several angles of views and viewing directions, which drastically reduces the probability of overlooking e.g. a lesion. On the other hand, the surrounding area of an already identified lesion can be quickly and conveniently controlled by controlling the orientation parameter. The orientation parameter can generally contain information on the viewing direction, on angles of view and rotation, for example contained encoded in real numbers.

It will be understood that, if exactly one second subset of the measured data record is processed into exactly one second pictorial representation, the representation is made in a second representation layer. Several second pictorial representations can be made in one and the same second representation layer or in different second representation layers.

The first and/or the at least one second pictorial representation can comprise in a particular advantageous manner spatial representations which can easily address the spatial sense of the user. In particular, the first pictorial representation can be an intraluminal view, and the at least one second pictorial representation can be an (intestinal) wall view, i.e. views those skilled in the art are normally familiar with. Advantageously, two pictorial second representations are displayed, for example during virtual coloscopy, one representation comprising or representing an anterior wall view, and the other one a posterior wall view, depending on whether it is an opposite or backward view of the intestinal wall. These views are obtained by virtually cutting open the intestinal tube in parallel to the longitudinal axis and making the photographies with virtual cameras which are oriented vertically to the longitudinal axis (also see below).

According to one example, the first pictorial representation shows a spatial view, in particular an intraluminal view, and/or the at least one second pictorial representation comprises a combined spatial and two-dimensional view. The at least one second pictorial representation here preferably represents a three-dimensional wall view with a two-dimensional representation of the neighboring (fatty) tissue adjacent to the exterior wall. The two-dimensional and/or the three-dimensional view can here contain defined gray scales. By such a second pictorial representation, in particular an infiltration of a tumor tissue starting from the interior side of the wall into the adjacent exterior neighboring tissue can be clearly identified. Advantageously, such an intraluminal view, a combined spatial and two-dimensional view in the form of an anterior wall view, and a combined spatial and two-dimensional view in the form of a posterior wall view are simultaneously presented to the user.

The at least one orientation parameter can in particular determine an intersecting plane in the first pictorial representation and/or an angle of rotation for the at least one second pictorial representation. For example, the at least one second pictorial representation can represent a section perpendicularly to the representation layer of the first pictorial representation, and by means of the orientation parameter, a position, inclination or rotation of the represented intersecting plane can be controlled. One can in particular obtain a complete impression of a three-dimensional area by rotation and inclination if the at least one second pictorial representation is a spatial representation.

The control device in the above-described further developments of the method according to the invention can comprise a computer mouse, in particular a scroll wheel and/or one or several buttons of a computer mouse, and/or a computer keyboard. For example, the user can select the at least one orientation parameter by scrolling the scroll wheel. By simultaneously scrolling and actuating a mouse button, he can e.g. rotate and tilt a representation layer. The control of the orientation parameter by means of a computer mouse provides a particular convenient and quick possibility of changing representation views in a controlled manner.

The at least one orientation parameter can also be selected by marking an area or a symbol of a graphical representation, in particular superposed on the first pictorial representation, by means of the control device, for example by means of a computer mouse. The graphical representation can comprise, for example, a circle with a graduation or a graphical representation of intervals of parameter values. Thus, a simple possibility of selecting the orientation parameter can be provided for the user. On the other hand, it can also be envisaged to select the orientation parameter by actuating a scroll bar, in particular by means of a computer mouse, as it is known in the prior art of the window-based screen display. Naturally, a keyboard can also be used for the selection of an orientation parameter.

In an alternative further development of the method according to the invention, the control device comprises a touch screen, and the at least one orientation parameter can be selected by touching the touch screen, whereby a convenient control/selection of the orientation parameter by the operator is also provided.

In the method disclosed herein, each value of an orientation parameter can be varied continuously or discretely automatically by the control device, in particular within a predetermined parameter range, so that the at least one orientation parameter takes different values, and for each different value of the at least one orientation parameter, at least one second pictorial representation can be displayed.

Thus, the orientation parameter can be selected e.g. as starting parameter, on the basis of which values are automatically set within a certain parameter range and the corresponding pictorial representation is presented. Continuous variation here means a change of the parameter in steps which are so small that the differences of directly subsequent pictorial representations can not or hardly be perceived. A discrete variation is the change of parameter values in predetermined steps (for example of some degrees) resulting in clearly distinguishable pictorial representations.

Each value of an orientation parameter can also be continuously or discretely selectable by means of the control device according to the input by a user, in particular within a predetermined parameter range, and for each of the various selected values of the at least one orientation parameter, at least one second pictorial representation can be displayed.

Here, the step of selecting each value of an orientation parameter can comprise the steps of locating a screen cursor, in particular a mouse pointer, in the at least one second pictorial representation for selecting the same, and of selecting at least one value of an orientation parameter, in particular an angle of rotation for rotating the view, by means of the control device, in particular by means of a wheel of a computer mouse. The selection of the at least one second pictorial representation can also be effected after locating the mouse pointer in the at least one second pictorial representation by actuating one or several of the mouse buttons.

Thus, it is e.g. permitted to the user to select at least one second pictorial representation by means of the computer mouse (or alternatively, for example, by means of a keyboard), for example by locating the mouse pointer in this representation, and then to change this representation according to a selection of a value of an orientation parameter, in particular an angle of rotation for a wall view. After the user has, for example, identified a tumor candidate in a first pictorial representation, he can subsequently view this tumor candidate from various directions by rotating the second pictorial representation.

The second representations which are shown consecutively by variation of the orientation parameter can be each displayed at the same location of a screen, in which case a subsequent pictorial representation is effected after the directly previous pictorial representation has been hidden.

By providing a sequence of second pictorial representations, the user can get an overview of a number of consecutive pictorial representations of the region of interest to be diagnosed in a very quick and convenient manner.

In the method according to the invention, at least one third subset of a three-dimensional measured data record, which can be part of the first subset or comprise the same, can be processed for a pictorial reproduction in at least one third pictorial representation, in particular a two-dimensional representation, in at least one third representation layer which can be equal to the first one.

The at least one third pictorial representation can comprise gray scales. These gray scales can be exactly selected as those in the above-described example of the at least one second view formed by a combination of a spatial and a two-dimensional representation.

For example, one can extract image data for (at least) one sectional view in the form of the third pictorial representation and image data for (at least) one spatial view in the form of the first and/or second pictorial representation from a three-dimensional data record acquired by means of virtual coloscopy, the first being better suited for detecting an abnormality and the latter better addressing the spatial sense. Preferably, the at least one third pictorial representation comprises an axial view and/or a frontal view and/or a sagital view and/or an oblique view (also see below). As it is nearly impossible to predict in advance which of the views is most suited for the diagnosis, by the use of different views, in particular several different sectional views and several different spatial views, a more reliable diagnosis can be made.

If one of the views comprises such an abnormality, the abnormal area in this representation can be selected e.g. by means of a mouse click, a mark polygon, or other selection methods. After the selection, it is automatically calculated where the selected area is located in the further representation, or how it is located relative to the further representation (the first and/or second pictorial representation). Correspondingly, in the method disclosed herein, at least one display space imaged in the at least one third pictorial representation can be selectable, the position or relative position of the at least one selected display space be calculated for the first pictorial representation, and the position or relative position of the at least one selected display space displayed in the first representation. The relative position indicates the position relative to the view and can, if the selected area is visible in the third and first/second pictorial representations, simply indicate the position in the corresponding pictorial representation. The relative position can also indicate a position behind a visible feature in a three-dimensional view.

Correspondingly, at least one display space imaged in the at least one third pictorial representation can be selectable, the relative position of the at least one selected display space be calculated for the second pictorial representation, and the relative position of the at least one selected display space displayed in the second representation.

If the at least one area selected in the third pictorial representation is also visibly imaged in the first/second representation, this can be indicated, for example, by a continuous bordering, a continuous circumcircle, etc. of the corresponding picture detail in the first/second representation. If in contrast the area is hidden by body tissue in the first/second representation, or if it is located, in case of tomograms, above or below the imaged plane, this (the relative position) can be indicated, for example, by a mark in broken lines. This furthermore has the advantage that several physicians, for example with various experience, in particular, however, those of different special fields (e. g. radiologists and gastroenterologists), whose standard views often differ from one another, can communicate in a more precise manner as the risk of mistakable diagnoses or interpretations is reduced. As a consequence, this leads to an improved cooperation between the physicians and to a better and consequently also cheaper treatment.

If the mark has a certain geometric shape, it is advantageous if it is deformed in the various pictorial representations corresponding to the respective viewing directions, so that a perspective impression is imparted to the observer.

The various pictorial representations can be, for example, represented simultaneously with one and the same reproduction means (e.g. monitor), where they can all be represented in the same size or in different sizes according to their significance.

In a preferred further development of the method according to the invention, one of the various representations, in particular one of the third pictorial representations, represents a topogram view (which will be described more in detail with reference to the attached figure), which gives an optimal overview of the examined area and for which computer-based methods exist for automatically visualizing the course of the intestine.

Thereby, in the represented course of the intestine, a position can be selected at which an abnormality is assumed or which has to be examined for other reasons, whereupon the correspondingly selected area or its relative position are displayed in the further representations or in the other representations.

In a preferred further development, the selection is made manually, for example via an input device, such as a computer mouse, a computer keyboard, by touching the screen (touchpad) etc. Alternatively or in addition, the selection of the imaged display space can be made via an automatic structure and/or texture recognition method which can detect abnormalities in an image by means of the special characteristics of the same.

In all examples of the method according to the invention, the three-dimensional measured data record can comprise recorded computer tomographic or nuclear spin tomographic data of at least a portion of a human or animal body, in particular a portion of an organ or blood vessel.

In general, for examining tubular bodies, such as tubes and blood vessels, a three-dimensional measured data record of the tubular body has to be processed such that a pictorial representation of a wall view with a viewing direction is obtained which is parallel or antiparallel to the vector of curvature at the maximal curvature of the central line of the tubular body.

Thus, in the method according to the invention, the three-dimensional measured data record can comprise recorded computer tomographic or nuclear spin tomographic data of at least a portion of a hollow organ, in particular the intestine, or a blood vessel, and at least one of the pictorial representations, in particular the at least one second pictorial representation, can be a wall view of the hollow organ or the blood vessel, which is seen from a viewing direction which is in parallel or antiparallel to the vector of curvature at the maximal curvature of the central line of the hollow organ or the blood vessel. Starting from this (default-like) view, then the at least one second pictorial representation can be rotated as described above (for example by selection of an angle of rotation by means of the wheel of a computer mouse) to easily and quickly permit a complete overview of the region of interest.

Such a central line can be, as a rule, still defined for a tubular body if the cross-sections of the body diverge from the ideal circularity, the calculation of the individual points defining the central line corresponding to that of centers.

The central line mathematically represents a three-dimensional curve r(s) parameterized with the curve length s. At each point of the three-dimensional curve, the tangent unit vector indicates the direction of the curve in this point. The vector of curvature points into the direction in which the tangent unit vector changes (the vector of curvature is thus perpendicular to the tangent unit vector). The vector of curvature is calculated from the second derivation of the three-dimensional curve according to the curve length $d^2\ r(s)/ds^2$, and its amount is referred to as curvature of the curve.

The "maximum curvature" can be an, in the mathematical sense, absolutely maximal curvature, but is as a rule the, in the mathematical sense, locally maximal curvature (local maximum), that means a site at which the vector of curvature is shorter than in the directly surrounding area.

The above described method is in general extremely helpful for examining tubular bodies which do not extend straightly along a direction in space, but are curved (possibly several times). The central line of such a body represents a curved line in the space.

In case of curved tubular bodies, the method results in at least one of the following wall views: the wall view of the area of the inner surface of the tubular body which is most curved in the longitudinal direction, and/or the opposite wall view. In case of bent tubes, these are the for example stretched and/or compressed wall sections where the material is particularly stressed and which are therefore particularly susceptible to defects. In case of the intestine or blood vessels, such areas of an extreme curvature to the point of buckling are sections where diseases do not only preferably occur but are also particularly difficult to detect with conventional methods.

The above described method according to the invention and its preferred further developments can be particularly well employed in the field of virtual endoscopy, in particular virtual coloscopy (but also in neighboring areas, such as virtual bronchoscopy, intestinoscopy, NHN-endoscopy, ventricle endoscopy). By the interaction between the various representations, the complementary advantages of various representations can be utilized and thus the specific disadvantages of each special representation can be overcome.

For example, the use of the method according to the invention in conventional coloscopy is also possible, as an ultrasonic head at a conventional coloscope, too, provides comparable 3D data records.

The present invention also provides a computer program product which comprises one or several machine-readable media (data carriers) with instructions to be carried out by the computer for carrying out the steps of one of the methods of claims 1 to 17.

The above mentioned object underlying the invention is further solved by an image processing and image reproduction system for carrying out one of the above examples of the method according to the invention, comprising:

at least one apparatus configured for processing one first subset of the three-dimensional measured data record for a pictorial reproduction in a first pictorial representation in a first representation layer, and for processing at least one second subset of the three-dimensional measured data record for a pictorial reproduction in at least one second pictorial representation in at least one second representation layer, and a control device, configured for the selection of at least one value of at least one orientation parameter for determining the orientation of the at least one second representation layer with respect to the first representation layer.

The control device can comprise a computer mouse, a touch screen, a keyboard, etc. The image processing and image reproduction system can furthermore comprise means for selecting at least one display space imaged in one of the representations in this representation and means for calculating the relative position of the at least one display space selected in the one representation for at least one further representation.

The image processing and image reproduction system can furthermore comprise a computer tomographic or nuclear spin tomographic device for creating the three-dimensional measured data record. Equally, an image processing and image reproduction system as mentioned above with a computer program product as mentioned above are provided.

Below, further details of embodiments of the invention are further illustrated with reference to the annexed figures. The described embodiments are in every respect only to be considered as illustrative and not as restrictive, and various combinations of the stated features are included in the invention.

FIG. 1 shows various views of an intestinal region which can be presented to a user by the method according to the invention. The upper row in FIG. 1 shows four two-dimensional views from left to right in the following sequence:

Figure 1:
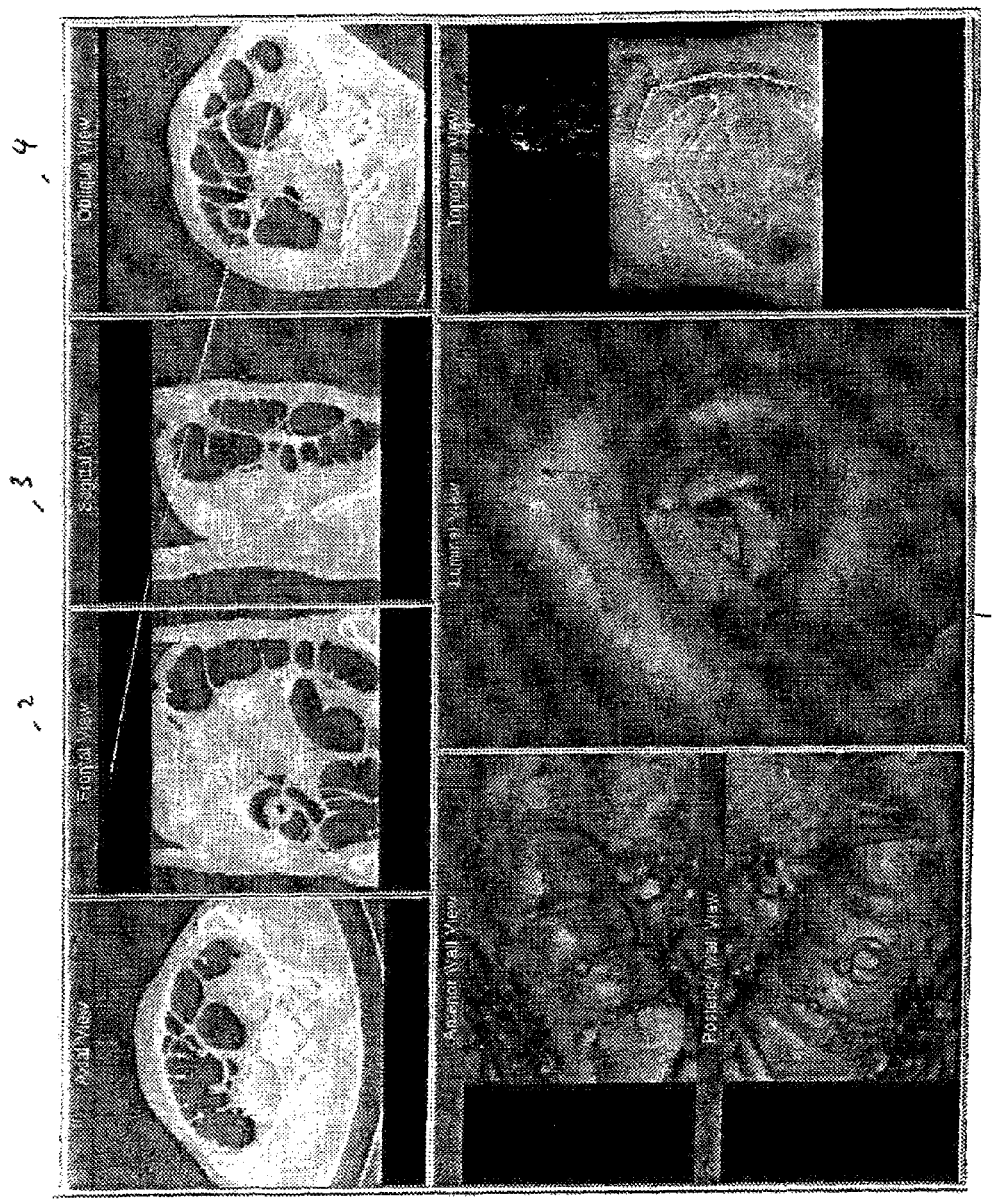
FIG. 1 shows useful views of the virtual coloscopy which are simultaneously presented to a user.

an axial view 1, corresponding to a section perpendicular to the longitudinal axis of the intestine, a frontal view 2, a side view or sagital view 3, and an oblique view 4.

The intersecting planes of the three tomograms 1, 2, 3 are perpendicular to one another. The orientation of the oblique view 4 is arbitrary. Its surface normal is advantageously positioned corresponding to an axis or preferential direction of the organ to be examined.

The two-dimensional tomography 4 is calculated from the three-dimensional measured data record created by means of a computer tomograph which in turn has been created from a plurality of two-dimensional measured data records.

The pictorial representations 5 to 8 represent spatial views and thus impart an overview of the examined body region.

Representations 4 and 5 are referred to as wall views. These images are obtained by virtually cutting open the intestinal tube in parallel to the longitudinal axis and taking the photographies with virtual cameras which are oriented vertically to the longitudinal axis. A difference is made between anterior wall view 5 and posterior wall view 6 and depending on whether it is an opposite or backward photography of the intestinal wall.

The two views 7 and 8 of FIG. 1 are the representations common for an internist. Together with the internist's experience, they impart a certain spatial conception of the region to be examined or treated.

The intraluminal view 7 corresponds to the image of the interior of the intestinal tube obtained with conventional coloscopy, with the difference that it has been made with a virtual coloscope.

The appearance of the topogram view 8 finally corresponds to a conventional X-ray photography, however, it has also been created from the three-dimensional data record of the tomography method. The sinuous line seen in the figure is a virtual path through the large intestine that is automatically generated by a computer.

If the examining physician notices a possible pathological change (abnormality) at the intestinal mucous membrane in one of the images, he can select the corresponding area in this image by means of a mouse click and then obtain the corresponding position in all other images in the two-dimensional sectional views as well as in the spatial representations.

In the latter, a mark will appear if the abnormality, e.g. a lesion, is visible for the virtual camera, and a dotted mark will appear, if it is not visible for the virtual camera. In this manner, the internist who possibly has to treat the findings will know behind which tissue portion (e.g. an intestinal fold) the finding is hidden. The intraluminal and topogram views, respectively, which the internist is familiar with and which very well serve the spatial orientation as concerns overview and clearness, are particularly important.

According to a preferred embodiment as an alternative to the example shown in FIGS. 5 and 6, the wall views can show combined two- and three-dimensional views. The cut-open intestinal tube area is here represented spatially. The adjacent neighboring tissue is only shown two-dimensionally with gray scale values which can correspond, for example, to those of a sagital or axial two-dimensional sectional view. The sections are first obtained corresponding to a viewing direction that is in parallel or antiparallel to the vector of curvature at the maximum curvature of the central line of the intestinal region at a predetermined site of the intestine. By the combination of the spatial cut-open view of the intestinal tube section with the two-dimensional representation of the adjacent tissue, in particular an infiltration of the fatty tissue around the intestine, i.e. outside the body wall of the intestine, can be very reliably detected.

The user can now point to one of the wall views (anterior wall view or posterior wall view) with the mouse pointer and thereby select the corresponding view. Then he can rotate the sectional view by means of the mouse wheel to obtain a complete overview of the region of interest in a convenient and quick manner. While the intraluminal view 7 can serve for the identification of a tumor (tumor candidate), the consecutive selection of various values of the angle of rotation for a rotation of the intersecting plane as an orientation parameter permits the best-possible view of the tumor (tumor candidate). A corresponding input can be made, instead of with the computer mouse, by means of a keyboard, e.g. via the arrow keys. The wall views with the two-dimensional representation of the neighboring tissue can thus be arbitrarily oriented.

According to another embodiment of the invention, the user can "click into" the intraluminal view 7 by means of a mouse pointer and determine therein a section perpendicular to the representation layer at the site of the mouse pointer. The anterior wall view 5 and posterior wall view 6 are represented. By scrolling the mouse wheel, these views can be continuously changed corresponding to the thus varied orientation parameter such that various sections, inclinations of the intersecting planes and/or angles of view are selected for the anterior wall view 5 and the posterior wall view 6.

Figure 2:
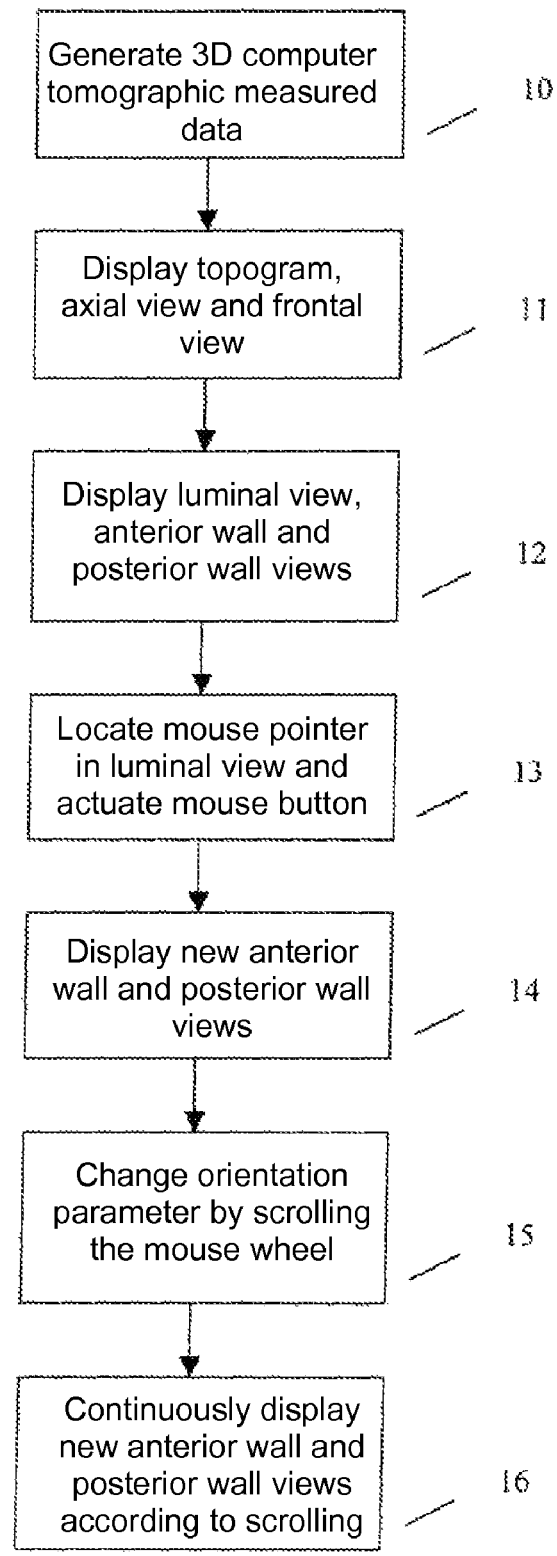
FIG. 2 illustrates the method for the pictorial representation of a three-dimensional computer tomographic measured data record corresponding to an example of the present invention.

FIG. 2 shows procedure steps for the pictorial representation of measured data which is controlled by means of an orientation parameter. First, three-dimensional measured data, for example of a large intestinal area, are generated by means of a computer tomograph 10. A topogram, an axial and a frontal view are displayed on a screen 11. Furthermore, a luminal view, an anterior wall as well as a posterior wall views are represented 12.

It can be envisaged that e.g. in the frontal view, a display space is selected by a user and the selected site is correspondingly displayed in the other views. It is assumed that the user is now interested in various representations in various representation layers of the posterior and anterior intestinal walls. In accordance with the invention, he can simply click with a mouse pointer into the intraluminal view 12 and select an intersecting plane whereupon a new representation of the anterior wall and posterior wall views is shown in accordance with the selected intersecting plane within the intraluminal view 14. By rotating the wheel of the computer mouse (scrolling) 15, the user can have various representation layers for the anterior wall and the posterior wall views displayed 16. Thus, he can continuously scroll through various representation layers in a quick and convenient manner. It can also be envisaged that he selects various angles of inclination and rotations of the representation layer as orientation parameter by means of the computer mouse, for example by simultaneously scrolling and actuating a mouse button.

The invention claimed is:

1. A method for the pictorial representation of a three-dimensional measured data record comprising recorded data of at least a portion of a human or animal body, wherein the portion of the human or animal body is a portion of an organ or blood vessel, the method comprising:
   creating the three-dimensional measured data record by means of a cross-sectional imaging device;
   processing a first subset of the three-dimensional measured data record for a pictorial reproduction in a first pictorial representation in a first representation layer; and
   processing at least one second subset of the three-dimensional measured data record for a pictorial reproduction in at least one second pictorial representation in at least one second representation layer, wherein at least one value of at least one orientation parameter for the determination of the orientation of the at least one second representation layer with respect to the first representation layer is selectable by means of a control device;
   wherein the at least one orientation parameter determines at least one of a position, a rotation, and an inclination of the at least one second representation layer; and
   wherein the at least one second pictorial representation comprises a combination of a three-dimensional wall of the or an or blood vessel and a two-dimensional representation of neighboring tissue adjacent to the exterior wall.

2. The method according to claim 1, wherein the first pictorial representation and/or the at least one second pictorial representation comprises a spatial representation.

3. The method according to claim 2, wherein the first pictorial representation is a spatial representation and/or the at least one second pictorial representation comprises a combination of a two-dimensional and a spatial representation.

4. The method according to claim 1, wherein the at least one orientation parameter determines the position and/or inclination of an intersecting plane in the first pictorial representation and/or an angle of rotation for the at least one second pictorial representation.

5. The method according to claim 1, wherein the control device comprises a computer mouse, in particular a scroll wheel and/or one or several buttons of a computer mouse, and/or a computer keyboard.

6. The method according to claim 1, wherein the at least one orientation parameter is selected by marking an area or a symbol of a graphical representation, in particular superposed on the first pictorial representation, by means of the control device, in particular by means of a computer mouse.

7. The method according to claim 1, wherein the orientation parameter is selected by actuating a scroll bar, in particular by means of a computer mouse.

8. The method according to claim 1, wherein the control device comprises a touch screen and the at least one orientation parameter can be selected by touching the touch screen.

9. The method according to claim 1, wherein
each value of an orientation parameter is continuously or discretely automatically varied, so that the orientation parameter takes various values, and
for each different value of an orientation parameter, at least one second pictorial representation is displayed.

10. The method according to claim 1, wherein
each value of an orientation parameter can be continuously or discretely selected by means of the control device according to the input by a user, in particular within a predetermined parameter range, and
for each different selected value of an orientation parameter, at least one second pictorial representation is displayed.

11. The method according to claim 10, wherein the step of selecting each value of an orientation parameter comprises:
pointing a screen cursor, in particular a mouse pointer, into the at least one second pictorial representation for selecting the same; and
selecting at least one value of an orientation parameter, in particular an angle of rotation, by means of the control device, in particular by means of a wheel of a computer mouse.

12. The method according to claim 1, further comprising processing at least one third subset of the three-dimensional measured data record for a pictorial reproduction in at least one third pictorial representation, in particular a two-dimensional representation, in at least one representation layer.

13. The method according to claim 12, wherein the at least one third pictorial representation is a sectional view, in particular an axial view and/or a frontal view and/or a sagital view and/or an oblique view.

14. The method according claim 12, wherein
at least one display space imaged in the at least one third pictorial representation can be selected,
for the first pictorial representation, the relative position of the at least one selected display space is calculated, and
the relative position of the at least one selected display space is displayed in the first representation.

15. The method according to claim 12, wherein
at least one display space imaged in the at least one third pictorial representation can be selected,
for the at least one second pictorial representation, the relative position of the at least one display space selected in the third pictorial representation is calculated, and
the relative position of the at least one display space selected in the third pictorial representation is displayed in the at least one second representation.

16. The method according to claim 1, wherein at least one of the pictorial representations, in particular one of the third pictorial representations, is a topogram view.

17. The method according to claim 1, wherein the three-dimensional measured data record comprises recorded computer tomographic or nuclear spin tomographic data of at a least a portion of a human or animal body, in particular a portion of an organ or a blood vessel.

18. The method according to claim 1, wherein the three-dimensional measured data record comprises recorded computer tomographic or nuclear spin tomographic data of at a least a portion of a hollow organ, in particular of the intestine, or of a blood vessel, and
at least one of the pictorial representations is a wall view seen from a viewing direction being in parallel or anti-parallel to the vector of curvature at the maximal curvature of the central line of the hollow organ or the blood vessel.

19. The method according to claim 12, wherein the selection of the imaged display space is performed manually and/or by means of a structure and/or texture recognition method.

20. The method according to claim 1 for the application in virtual endoscopy, in particular virtual coloscopy.

21. A non-transitory computer-readable storage medium comprising computer-coded segments that, when executed by a computer system, cause the computer system to carry out the method of claim 1.

22. An image processing and image reproduction system for carrying out a method according to claim 1, comprising:
at least one means configured for processing one first subset of the three-dimensional measured data record for a pictorial reproduction in a first pictorial representation in a first representation layer, and for
processing at least one second subset of the three-dimensional measured data record for a pictorial reproduction in at least one second pictorial representation in at least one second representation layer, and
a control device, configured for the selection of at least one value of at least one orientation parameter for the determination of the orientation of the at least one second representation layer with respect to the first representation layer,
wherein the at least one orientation parameter determines at least one of a position, a rotation and an inclination of the at least one second representation layer, and
wherein the at least one second pictorial representation comprises a combination of a three-dimensional wall view of the or an or blood vessel and a two-dimensional representation of neighboring tissue adjacent to the exterior wall.

23. The image processing and image reproduction system of claim 22, furthermore comprising
a means configured for the selection of at least one display space imaged in one of the representations, and
a means configured for the calculation of the relative position of the at least one display space selected in the at least one representation for at least one other representation.

24. The image processing and image reproduction system of claim 22, furthermore comprising a cross-sectional imaging device for creating the three-dimensional measured data record.

25. The method according to claim 1, wherein the cross-sectional imaging device is a computer tomographic or nuclear spin tomographic device.

26. The image processing and image reproduction system according to claim 24, wherein the cross-sectional imaging device is a computer tomographic or nuclear spin tomographic device.

* * * * *